R. P. FINLAY.
VALVE GEAR FOR DIRECT ACTING FLUID PRESSURE ENGINES.
APPLICATION FILED JUNE 1, 1915.

1,153,613.

Patented Sept. 14, 1915.

R. P. FINLAY.
VALVE GEAR FOR DIRECT ACTING FLUID PRESSURE ENGINES.
APPLICATION FILED JUNE 1, 1915.

1,153,613.

Patented Sept. 14, 1915.
5 SHEETS—SHEET 2.

R. P. FINLAY.
VALVE GEAR FOR DIRECT ACTING FLUID PRESSURE ENGINES.
APPLICATION FILED JUNE 1, 1915.

1,153,613.

Patented Sept. 14, 1915.
5 SHEETS—SHEET 5.

UNITED STATES PATENT OFFICE.

ROBERT PETTIGREW FINLAY, OF WEST HARTLEPOOL, DURHAM, ENGLAND.

VALVE-GEAR FOR DIRECT-ACTING FLUID-PRESSURE ENGINES.

1,153,613.      Specification of Letters Patent.     Patented Sept. 14, 1915.

Application filed June 1, 1915. Serial No. 31,636.

*To all whom it may concern:*

Be it known that I, ROBERT PETTIGREW FINLAY, a subject of the King of the United Kingdom of Great Britain and Ireland, and residing at West Hartlepool, Durham, England, have invented a certain new and useful Improvement in Valve-Gear for Direct-Acting Fluid-Pressure Engines, of which the following is a specification.

This invention relates to improvements in valve gear for direct acting fluid pressure engines of the kind including an auxiliary or pilot valve adapted to control the supply of fluid to the engine cylinder through the intermediary of a main distributing valve.

The primary object of the present improvements is to provide means whereby the distribution of fluid under pressure passing to the engine cylinder may be controlled continuously throughout the entire stroke of the engine piston, thereby permitting the engine to work at high speeds with the minimum of shock, said means including adjustable members for the mechanical operation of said pilot valve by the adjustment of which members the mean position of the pilot valve may be varied to suit the working conditions and the travel of the pilot valve regulated.

The invention is illustrated in the accompanying drawings in which—

Figure 1:
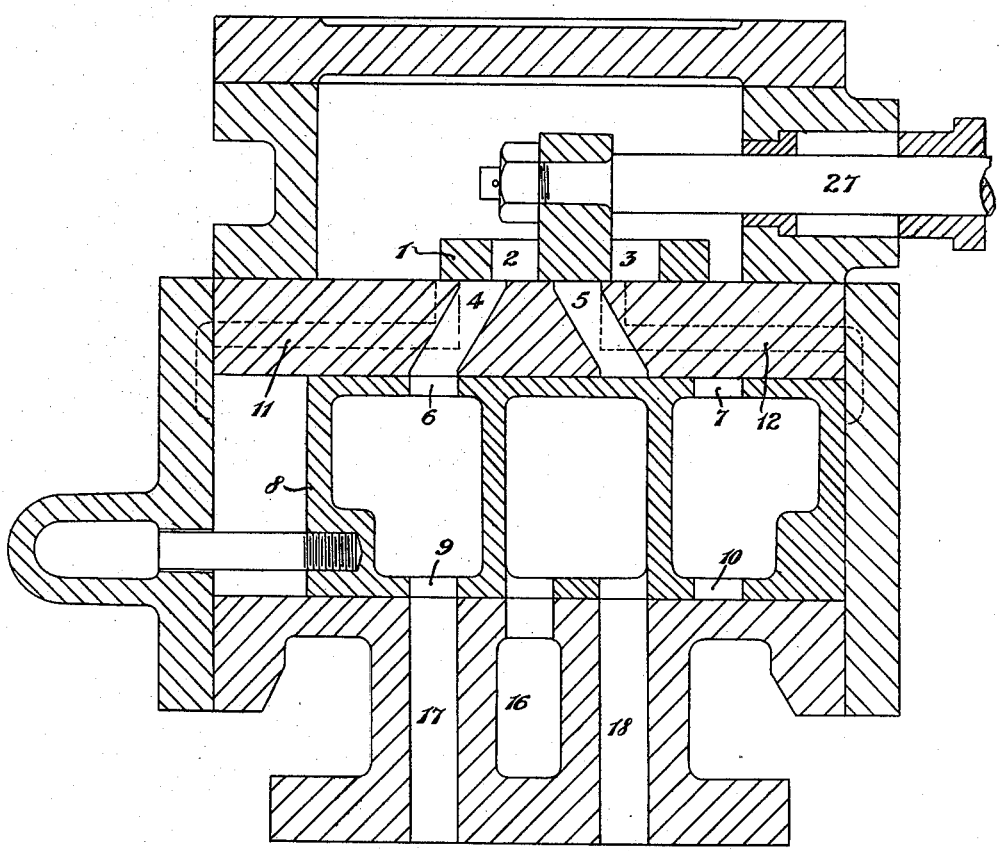
Figure 2:
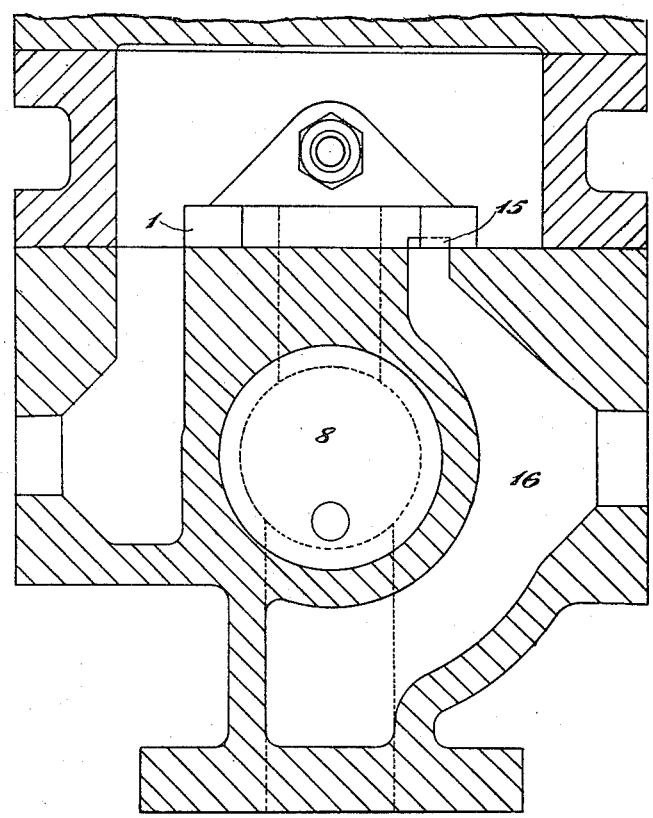
Figure 5:
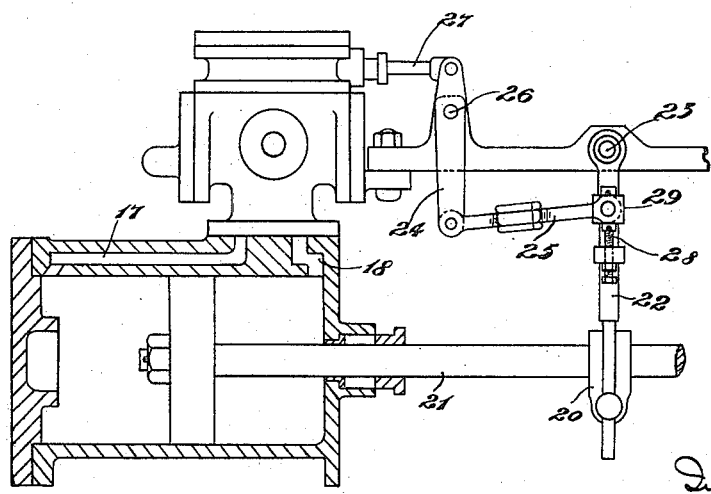
Figure 3:
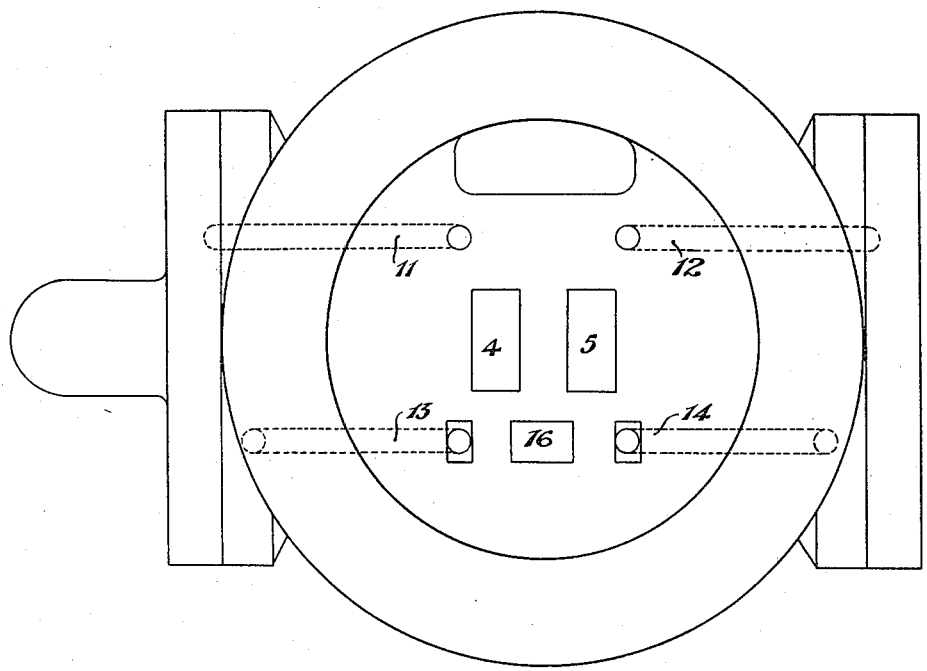
Figure 4:
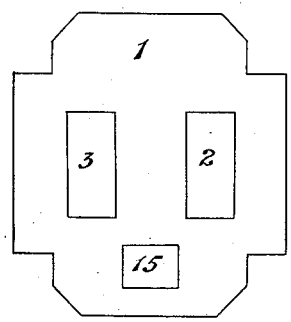
Figure 9:
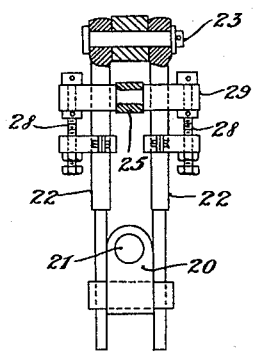
Figure 10:
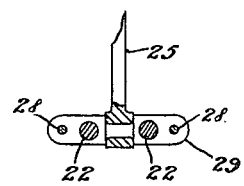
Figure 6:
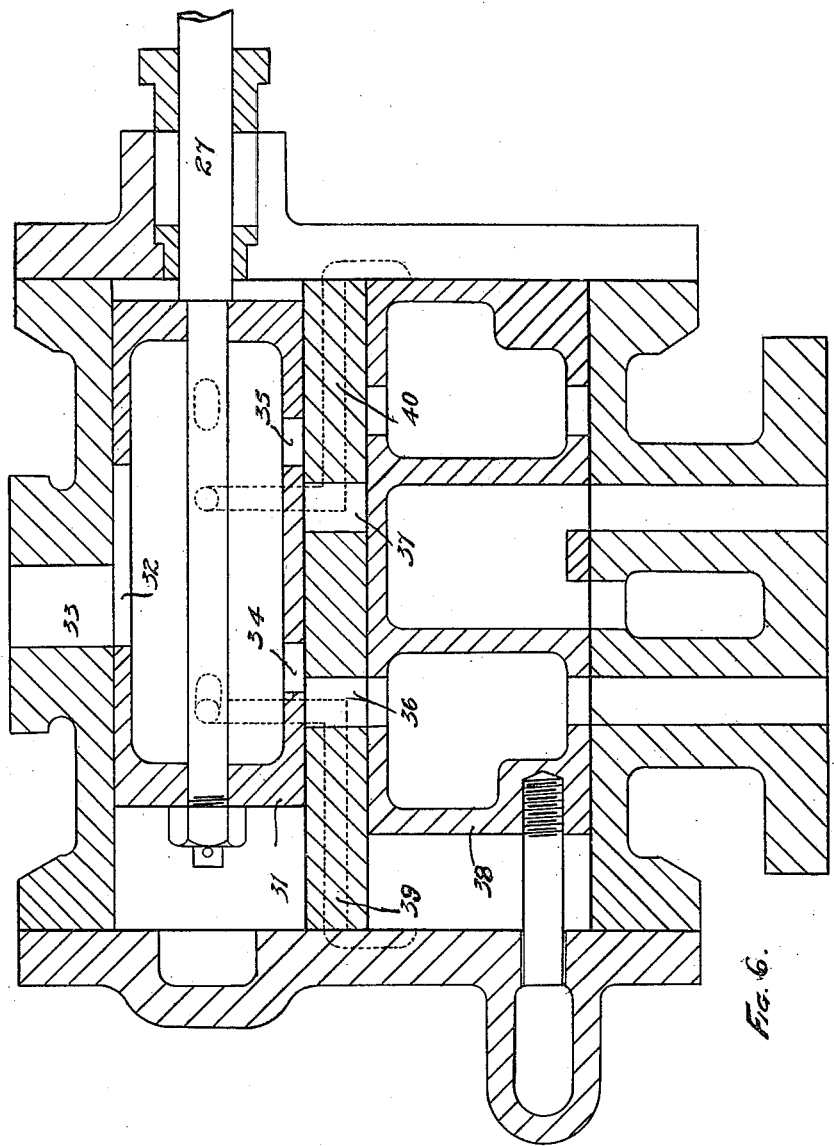

Figure 1 is a longitudinal vertical section and Fig. 2 a transverse vertical section of the valve chest of a fluid pressure engine equipped with a pilot valve of the slide valve type; Fig. 3 is a plan of the valve chest showing the arrangement of port openings; Fig. 4 is an inverted plan of the slide valve and Fig. 5 is a part section part elevation of a fluid pressure engine showing the pilot valve actuating mechanism. Fig. 6 is a longitudinal vertical section, Fig. 7 a transverse vertical section, Fig. 8 a horizontal section of the valve chest of a fluid pressure engine illustrating the application of the invention to an engine provided with a pilot valve of the piston valve type and Figs. 9 and 10 are an end view and detail view respectively of the pilot valve actuating mechanism.

Referring to Figs. 1, 2, 3 and 4, 1 denotes the pilot valve provided with admission ports 2, 3 adapted to be brought into and out of register with corresponding passages 4, 5 formed on the valve chest.

8 is the distributing valve formed preferably as a piston valve and adapted to be actuated by fluid under pressure led by way of ports 11, 12 and 13, 14, the opening of which is controlled by the slide valve 1. The ports 13, 14 act also as exhaust ports for the distributing valve, a small cavity 15 being formed in the slide valve 1 through which the main exhaust passage 16 may communicate with either of said exhaust ports. The distributing valve 8 is provided with ports 6, 9 adapted to establish communication between the passage 4 and a passage 17 leading to the rear end of the cylinder on the forward stroke of the engine and with a similar series of ports 7, 10 for communication between the passage 5 and the passage 18 leading to the front end of the cylinder when the piston is traveling in the reverse direction.

Movement is imparted to the pilot valve continuously through the entire stroke of the piston of the engine through the intermediary of a crosshead 20 (Figs. 5 and 9) mounted on the engine piston rod 21 which engages with lateral levers 22 swinging on a fixed fulcrum 23, said lateral levers 22 being attached through the intermediary of an adjustable link 25 to the long arms of double rocking levers 24 fulcrumed at 26, the short arms of which engage the valve spindle 27 of the pilot valve. With this arrangement of levers the movement of the pilot valve, although small in extent, is proportional to the movement of the main engine piston.

By variation of the length of the adjustable link 25, the mean position of the pilot valve may be varied to suit the working conditions and the travel of the pilot valve may be adjusted by means of set screws 28 mounted on the levers 22 and provided with a head piece 29 to which is connected one end of the adjustable link 25 (Fig. 10).

At the beginning of the forward stroke of the main engine piston the steam port 2 registers with the passage 4 to the extent of about one quarter of its area, with which comparatively small opening of steam port the main engine piston starts quietly and smoothly, the distributing valve 8 being in the position shown in Fig. 1. As the main engine piston moves from the beginning of its stroke, the pilot valve increases the opening of the steam port 4 until by the time mid-position or half-stroke is reached said steam port is fully open. The piston is therefore traveling with maximum velocity at this point. After half-stroke position is passed, the pilot valve decreases the steam port opening until by the time seven eighths of the stroke have been accomplished the steam is cut off. The remainder of the stroke is completed by the expansive power of the propelling fluid, and the piston arrives slowly at the end of the stroke without shock. The cycle of operations is repeated during the opposite stroke.

Figure 7:
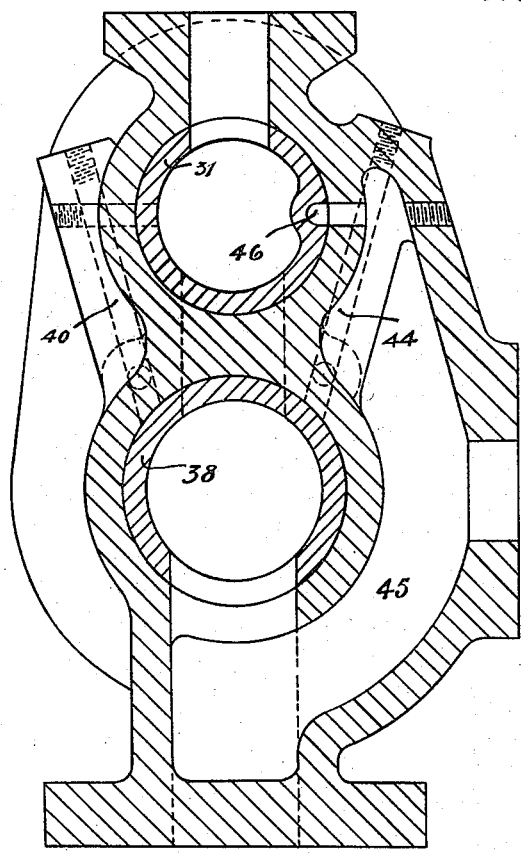
Figure 8:
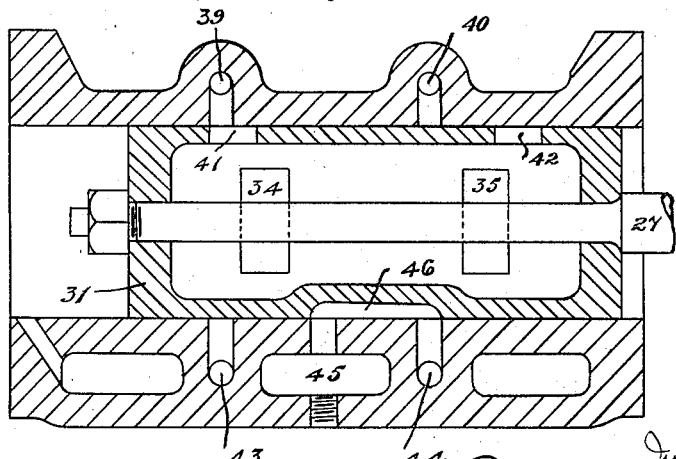

Referring to Figs. 6, 7 and 8, the pilot valve 31 is formed as a hollow cylinder into which fluid under pressure is led by way of a gap 32 formed in the cylinder wall and communicating with the steam inlet passage 33, and is provided with steam admission ports 34, 35 adapted to be brought into and out of register with passages 36, 37 leading to a distributing valve 38 of the type described above. The distributing valve cylinder is provided with steam inlet passages or ports 39, 40 the opening to steam of which is controlled by corresponding ports 41, 42 formed in the wall of the pilot valve 31 and provided with exhaust ports 43, 44 adapted to be brought into communication with the main exhaust passage 45 by means of a cavity 46 formed in the wall of the pilot valve.

What I claim is:—

In a valve gear for a fluid pressure engine, the combination with the engine piston and piston rod, of a reciprocating pilot valve, a reciprocatory distributing valve whose reciprocatory movement is controlled by said pilot valve, a pivoted lever adapted to receive oscillatory movement from said piston rod, a double armed rocking member having an arm connected with said pilot valve, and a link connecting said lever with the other arm of said rocking member, the said link having an adjustable connection with said lever so as to permit the throw of the said pilot valve to be varied.

In testimony whereof I have signed my name to this specification in the presence of two subscribing witnesses.

ROBERT PETTIGREW FINLAY.

Witnesses:
WALLACE CRANSTON FAIRWEATHER,
HENRY MASON.

Copies of this patent may be obtained for five cents each, by addressing the "Commissioner of Patents, Washington, D. C."